US010846825B2

(12) United States Patent
Osawa

(10) Patent No.: US 10,846,825 B2
(45) Date of Patent: Nov. 24, 2020

(54) DISPLAY CONTROL APPARATUS, INFORMATION PROCESSING APPARATUS, DISPLAY CONTROL METHOD, PROGRAM FOR DISPLAY CONTROL, AND RECORDING MEDIUM

(71) Applicant: PIONEER CORPORATION, Bunkyo-ku, Tokyo (JP)

(72) Inventor: Kenji Osawa, Saitama (JP)

(73) Assignee: PIONEER CORPORATION, Tokyo (JP)

( * ) Notice: Subject to any disclaimer, the term of this patent is extended or adjusted under 35 U.S.C. 154(b) by 0 days.

(21) Appl. No.: 15/563,472

(22) PCT Filed: Mar. 31, 2015

(86) PCT No.: PCT/JP2015/060160
§ 371 (c)(1),
(2) Date: Sep. 29, 2017

(87) PCT Pub. No.: WO2016/157418
PCT Pub. Date: Oct. 6, 2016

(65) Prior Publication Data
US 2018/0068417 A1 Mar. 8, 2018

(51) Int. Cl.
*G06T 3/60* (2006.01)
*G06F 3/0484* (2013.01)
(Continued)

(52) U.S. Cl.
CPC ............ *G06T 3/60* (2013.01); *G01C 21/3664* (2013.01); *G01C 21/3673* (2013.01);
(Continued)

(58) Field of Classification Search
CPC ............ G01C 21/3664; G01C 21/3673; G06F 3/04845; G06F 2203/04806; G09B 29/106
See application file for complete search history.

(56) References Cited

U.S. PATENT DOCUMENTS

2009/0207184 A1 8/2009 Laine et al.
2011/0313649 A1* 12/2011 Bales ..................... G01C 21/20
701/455

(Continued)

FOREIGN PATENT DOCUMENTS

JP 2000322174 A 11/2000
JP 3835981 B 8/2006
(Continued)

OTHER PUBLICATIONS

International Search Report for PCT/JP2015/060160, dated Jun. 1, 2015, 2 pgs.

*Primary Examiner* — Grace Q Li
(74) *Attorney, Agent, or Firm* — Procopio, Cory, Hargreaves & Savitch LLP

(57) ABSTRACT

A display control apparatus enabling a desired item to be displayed with excellent visibility by means of a simple operation is provided.
An interface 1 of a terminal apparatus SV acquires associated information in which an orientation of display on a display D, a moving direction of an operation position to a touch panel TP, and a display state on the display D controlled by movement of the operation position are associated with each other. The interface 1 also acquires direction information indicating the moving direction of the operation position. A control unit 3 controls the display state on the display D in accordance with the orientation of the
(Continued)

display and the moving direction indicated by the direction information based on the associated information.

10 Claims, 4 Drawing Sheets

(51) Int. Cl.
G01C 21/36 (2006.01)
G06F 3/0488 (2013.01)
G09B 29/00 (2006.01)
G09B 29/10 (2006.01)

(52) U.S. Cl.
CPC ...... *G06F 3/04845* (2013.01); *G06F 3/04883* (2013.01); *G09B 29/005* (2013.01); *G09B 29/106* (2013.01); *G06F 2203/04806* (2013.01)

(56) References Cited

U.S. PATENT DOCUMENTS

| | | | |
|---|---|---|---|
| 2012/0274663 A1 | 11/2012 | Laine et al. | |
| 2013/0162684 A1* | 6/2013 | Williams | G09G 5/363 |
| | | | 345/650 |
| 2013/0307794 A1* | 11/2013 | Nagumo | G06F 3/041 |
| | | | 345/173 |
| 2014/0009500 A1 | 1/2014 | Laine et al. | |
| 2014/0089828 A1* | 3/2014 | Okuma | G03G 15/5016 |
| | | | 715/765 |
| 2014/0201024 A1* | 7/2014 | Collier | G06Q 30/0621 |
| | | | 705/26.5 |
| 2014/0282284 A1 | 9/2014 | Matsuo | |
| 2014/0300642 A1 | 10/2014 | Laine et al. | |
| 2015/0116114 A1* | 4/2015 | Boyles | G08B 25/00 |
| | | | 340/539.17 |
| 2015/0304251 A1* | 10/2015 | Greenberg | H04L 51/046 |
| | | | 715/752 |
| 2016/0092043 A1* | 3/2016 | Missig | G06F 3/0482 |
| | | | 715/811 |
| 2016/0147398 A1* | 5/2016 | Chang | G06F 3/1454 |
| | | | 715/753 |
| 2018/0063397 A1* | 3/2018 | Sudou | H04N 5/232 |

FOREIGN PATENT DOCUMENTS

| | | |
|---|---|---|
| JP | 2010135967 A | 6/2010 |
| JP | 2011515884 A | 5/2011 |
| JP | 201355376 A | 3/2013 |
| WO | 2007023898 A | 2/2009 |

\* cited by examiner

FIG. 3

| DISPLAY ORIENTATION | VERTICAL | | HORIZONTAL | | VERTICAL/HORIZONTAL COMMON |
|---|---|---|---|---|---|
| OPERATION | VERTICAL-DIRECTION PINCH-OUT | HORIZONTAL-DIRECTION PINCH-OUT | VERTICAL-DIRECTION PINCH-OUT | HORIZONTAL-DIRECTION PINCH-OUT | DOUBLE TAP | TAP |
| CONTENTS OF CONTROL | MAP ENLARGEMENT | ONCE: ENLARGEMENT OF LETTER STRING<br>TWICE: CHANGE OF LETTER STRING COLOR<br>THREE TIMES: ADDITION OF LETTER STRING BACKGROUND COLOR<br>FOUR TIMES: RESET | MAP ENLARGEMENT | | MAP ENLARGEMENT | ONCE (SINGLE TAP): ENLARGEMENT (ONLY AROUND LETTER STRING)<br>TWICE: CHANGE OF LETTER STRING COLOR<br>THREE TIMES: ADDITION OF LETTER STRING BACKGROUND COLOR<br>FOUR TIMES: RESET |

FIG. 5
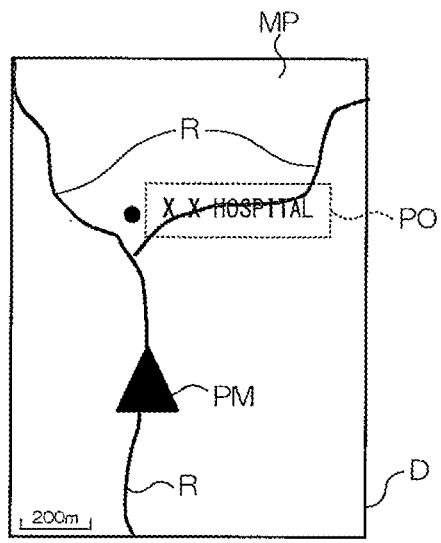
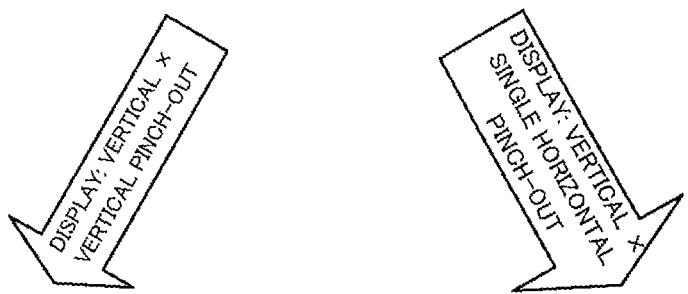
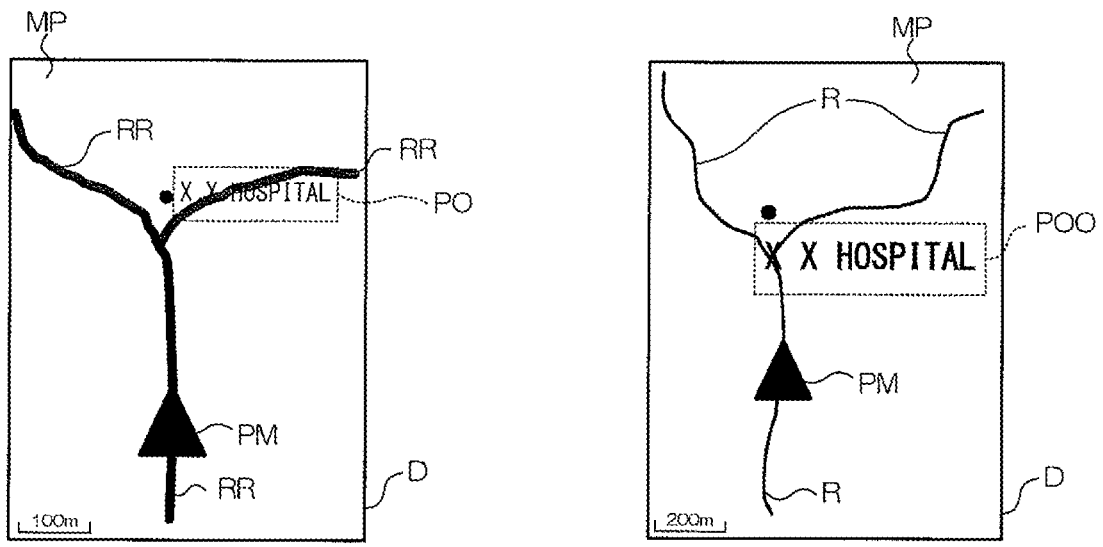

DISPLAY CONTROL APPARATUS, INFORMATION PROCESSING APPARATUS, DISPLAY CONTROL METHOD, PROGRAM FOR DISPLAY CONTROL, AND RECORDING MEDIUM

TECHNICAL FIELD

The present application relates to a technical field of a display control apparatus, an information processing apparatus, a display control method, a program for display control, and a recording medium. The present application more specifically relates to a display control apparatus and a display control method configured to control a display state based on an operation to an operation unit such as a touch panel, an information processing apparatus comprising the display control apparatus, a program for the display control apparatus, and a recording medium having recorded therein the program.

BACKGROUND ART

In recent years, a portable terminal apparatus represented by a smartphone is widely used. Known is a technique in which map display software and navigation software are installed in such a terminal apparatus, and in which movement of a vehicle on which a person who possesses the terminal apparatus rides is guided with use of the software.

The aforementioned terminal apparatus is configured to enable a user to increase and decrease the size of an item displayed via a browser, a map, or the like easily in a manner that matches the image of the user by performing so-called pinch-out and pinch-in operations with use of a touch panel provided on the display surface. Here, the aforementioned pinch-out operation is an operation in which two fingers of the user is brought into contact with the touch panel simultaneously, and in which the distance between the fingers is then increased, and is an operation that enables the user to easily call up the image of the size increase of the display of the map, for example. Also, contrary to the pinch-out operation, the aforementioned pinch-in operation is an operation in which the distance between the two fingers of the user contacting the touch panel simultaneously is decreased, and is an operation that enables the user to easily call up the image of the size decrease of the display of the map, for example.

Meanwhile, in a general navigation apparatus, known is a technique in which a display size (a size on a display screen) of a letter string with high priority is increased or decreased in accordance with the attribute (category) that each name of places, facilities, and the like displayed on a map has without changing the scale size of a map that is being displayed. An example of a citation of such a conventional technique is Patent Literature 1 described below. In the technique described in Patent Literature 1, in a case of a size increase of display, all of the display sizes of names of places, facilities, and the like belonging to the category related to a letter string with high priority are increased.

CITATION LIST

Patent Literature

Patent Literature 1: JP 3835981 B2

SUMMARY OF INVENTION

Technical Problem

More in general, since the aforementioned terminal apparatus has a smaller display screen size than that of the in-vehicle navigation apparatus, map items, place names, and the like displayed on the display screen are difficult to be seen in many cases.

Accordingly, in a case in which the technique described in Patent Literature 1 is applied to display of the map and the like on the aforementioned terminal apparatus, all of the sizes of the place names and the like belonging to the category related to the letter strings with high priority are increased when they are displayed. In this case, many place names and the like are enlarged and displayed on the small-size display screen at a time, which causes a problem in which the visibility of desired information is rather lowered. This problem leads to a problem in which the user cannot check user-desired information such as place names instantaneously.

The present application is accomplished by taking the above problems into consideration thereof, and an example of an object thereof is to provide a display control apparatus and a display control method enabling a desired item to be displayed with excellent visibility by means of a simple operation, an information processing apparatus including the display control apparatus, a program for the display control apparatus, and a recording medium having recorded therein the program.

Solution to Problem

To solve the above problem, the invention according to claim 1 is a display control apparatus that controls a display state in a display means based on an operation to an operation unit, comprising: an associated information acquisition means that acquires associated information in which an orientation of display on the display means, a moving direction of an operation position to the operation unit, and the display state controlled by movement of the operation position are associated with each other; a direction information acquisition means that acquires direction information indicating the moving direction; and a control means that controls, based on the associated information acquired, the display state in accordance with the orientation of the display and the direction information.

To solve the above problem, the invention according to claim 7 is an information processing apparatus comprising: the display control apparatus according to any one of claims 1 to 6; the operation unit; and the display means in which the display state is controlled by the control means.

To solve the above problem, the invention according to claim 8 is a display control method executed in a display control apparatus that controls a display state in a display means based on an operation to an operation unit, comprising: an associated information acquisition step of acquiring associated information in which an orientation of display on the display means, a moving direction of an operation position to the operation unit, and the display state controlled by movement of the operation position are associated with each other; a direction information acquisition step of acquiring direction information indicating the moving direction; and a control step of controlling, based on the associated information acquired, the display state in accordance with the orientation of the display and the direction information.

To solve the above problem, the invention according to claim 9 is a program for display control that causes a computer to function as the display control apparatus according to any one of claims 1 to 6.

To solve the above problem, the invention according to claim 10 is a recording medium that has recorded therein the program for display control according to claim 9 to be readable by the computer.

BRIEF DESCRIPTION OF DRAWINGS

FIG. 3 is a figure illustrating contents of an association table according to the example.

FIG. 5 is a figure illustrating display examples according to the example.

DESCRIPTION OF EMBODIMENTS

Figure 1:
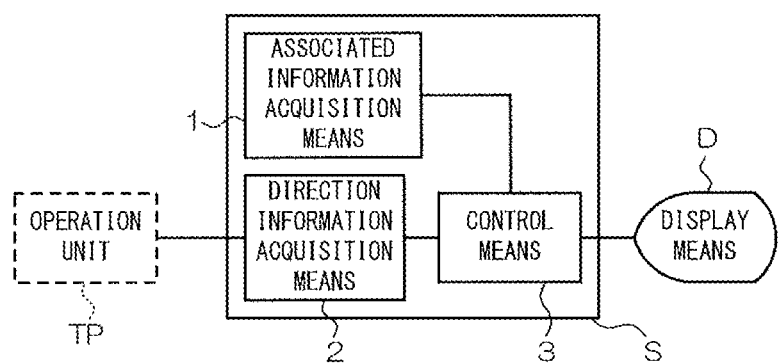
FIG. 1 is a block diagram illustrating an overview of a configuration of a display control apparatus according to an embodiment.

Next, an embodiment of the present application will be described with reference to FIG. 1. FIG. 1 is a block diagram illustrating an overview of a configuration of a display control apparatus according to the embodiment.

As illustrated in FIG. 1, a display control apparatus S according to the embodiment is connected to a display means D and an operation unit TP and is a display control apparatus configured to control a display state on the display means D based on an operation to the operation unit TP. The display control apparatus S according to the embodiment is configured to comprise an associated information acquisition means 1, a direction information acquisition means 2, and a control means 3.

In this configuration, the associated information acquisition means 1 acquires associated information in which an orientation of display on the display means D, a moving direction of an operation position on the operation unit TP, and a display state on the display means D controlled by movement of the operation position are associated with each other.

On the other hand, the direction information acquisition means 2 acquires direction information indicating a moving direction of the operation position.

And, the control means 3 controls, based on the associated information acquired by the associated information acquisition means 1, a display state on the display means D in accordance with the orientation of the display and the direction information acquired by the direction information acquisition means 2.

As described above, in the display control apparatus S according to the embodiment, associated information in which an orientation of display on the display means D, a moving direction of a contact position on a contacted unit, and a display state controlled by movement of the contact position are associated with each other is acquired, and a display state on the display means D is controlled in accordance with the orientation of the display and the direction information based on the associated information. Accordingly, for example, since a different display state can be controlled by an easy operation of single movement of the operation position in accordance with the orientation of the display on the display means D, desired display with excellent visibility can be performed by the easy operation.

EXAMPLES

Next, a specific example of the aforementioned embodiment will be described with reference to FIGS. 2 to 5. The example described below is an example in a case in which the present application is applied to display control in a terminal apparatus including a touch panel such as a vehicle navigation apparatus, a tablet terminal apparatus, and a smartphone.

Figure 2:
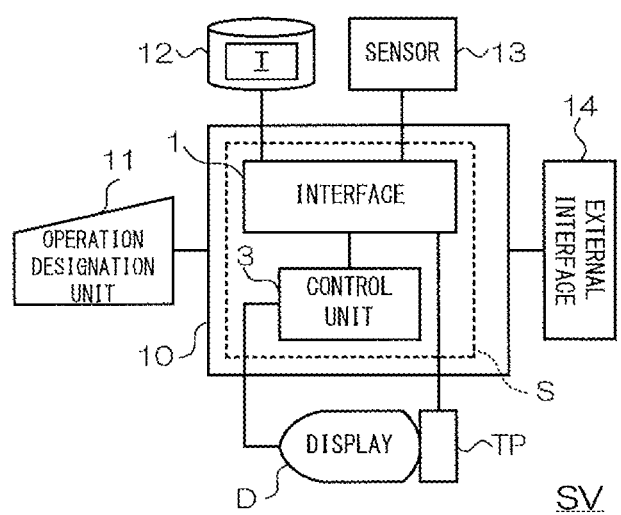
FIG. 2 is a block diagram illustrating an overview of a configuration of a terminal apparatus according to an example.
Figure 4:
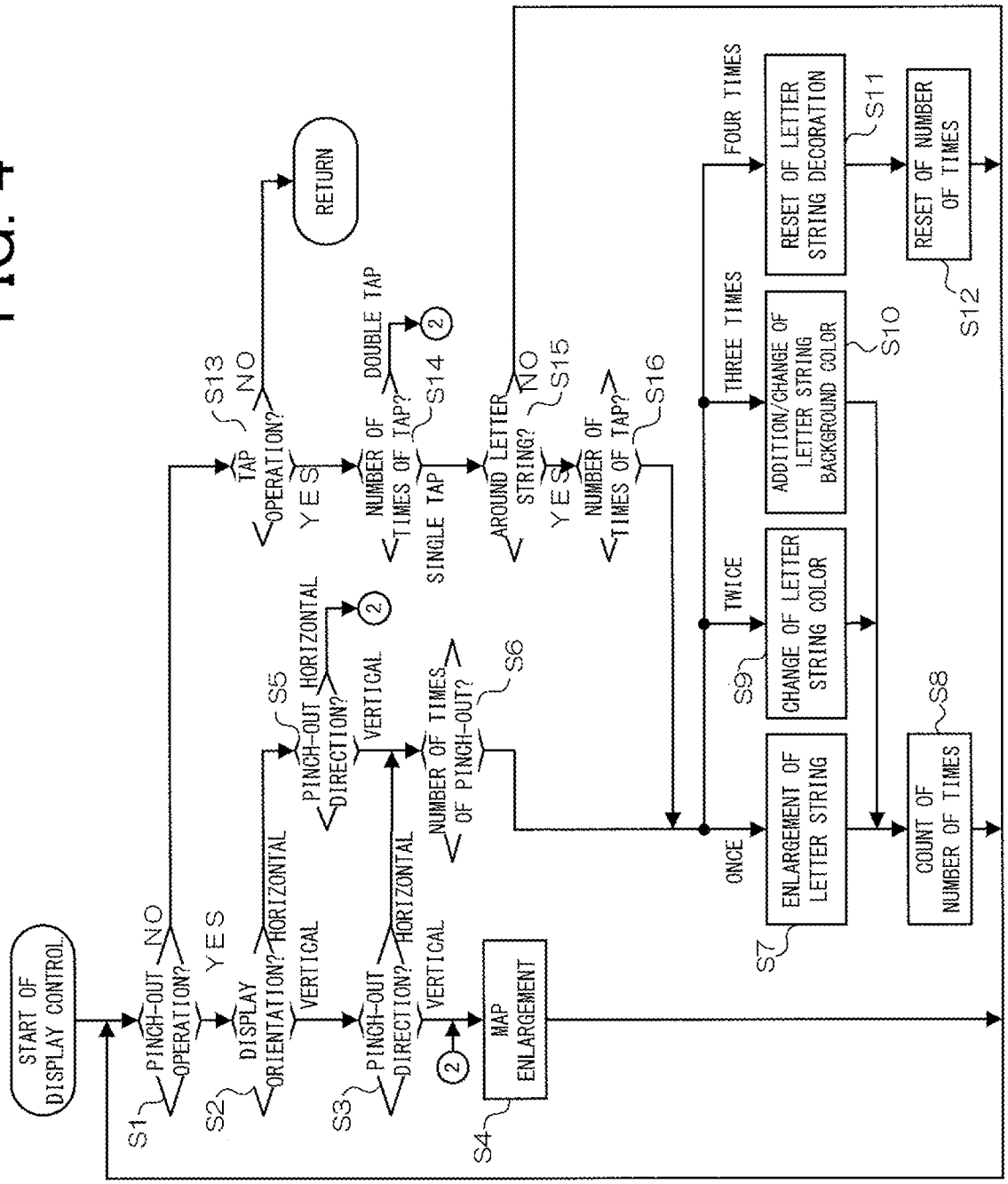
FIG. 4 is a flowchart illustrating display control according to the example.

FIG. 2 is a block diagram illustrating an overview of a configuration of a terminal apparatus according to the example, FIG. 3 is a figure illustrating contents of an association table according to the example, FIG. 4 is a flowchart illustrating display control according to the example, and FIG. 5 is a figure illustrating display examples according to the example. At this time, in FIG. 2, component members in the example corresponding to the respective component members in the display control apparatus S according to the embodiment illustrated in FIG. 1 are shown with the same reference signs as those for the respective component members in the display control apparatus S.

As illustrated in FIG. 2, the terminal apparatus SV according to the example and corresponding to an example of "an information processing apparatus" according to the application is fulfilled as the aforementioned navigation apparatus, tablet terminal apparatus, smartphone, or the like. The terminal apparatus SV comprises a processing unit 10 which consists of a CPU, a RAM (random access memory), a ROM (read only memory), and the like, a display D which consists of a rectangular liquid crystal display or the like having on a surface thereof a touch panel TP serving as an example of the operation unit TP according to the embodiment on which the aforementioned pinch-out operation and the like are executed with use of fingers of a user of the terminal apparatus SV, a touch pen, or the like, and which serves as an example of the display means D according to the embodiment, an operation designation unit 11 which comprises an operation button or the like except the touch panel TP, a recording unit 12 which comprises a recording medium such as an HDD (hard disc drive) or an SSD (solid state drive), a sensor 13 such as an acceleration sensor which detects an orientation of the display D itself at the time of use of the terminal apparatus SV, and an external interface 14 which is connected to a network outside the terminal apparatus SV such as the Internet in a wireless or wired manner. At this time, the recording unit 12 has recorded therein a below-mentioned association table T according to the example in a non-volatile manner. The recording unit 12 also has pre-recorded therein a program corresponding to below-mentioned display control according to the example, a program for controlling processing or operations of the terminal apparatus SV except the display control, and the like in a non-volatile manner. It is to be noted that, in the following description, the above expression "user's fingers, a touch pen, or the like" is referred simply as "fingers or the like." Also, the touch panel TP includes a contact unit whose surface is contacted by the fingers or the like and a driving unit which drives the contact unit.

On the other hand, the processing unit 10 comprises an interface 1 which serves as an example of each of the associated information acquisition means 1 and the direction information acquisition means 2 according to the embodiment and "a position information acquisition means" according to the present application and a control unit 3 which serves as an example of each of the control means 3 according to the embodiment and "a tap operation detection means" according to the present application. At this time, specifically, the interface 1 and the control unit 3 may be fulfilled by a hardware logic circuit included in the CPU or the like constituting the processing unit 10 or may be fulfilled in a manner of software when the CPU or the like reads out and executes a program corresponding to the flowchart (refer to FIG. 4) illustrating the below-mentioned display control according to the example. Also, as illustrated by the dashed line in FIG. 2, the interface 1 and the control unit 3 constitute an example of the display control apparatus S according to the embodiment.

In the above configuration, the external interface 14 controls transmission/reception of data required for processing or operations of the terminal apparatus SV between the processing unit 10 and the network when the data is acquired from the network under the control of the processing unit 10.

Further, when an operation which designates processing or an operation to be executed by the terminal apparatus SV is executed by the user in the operation designation unit 11, the operation designation unit 11 generates an operation signal corresponding to the contents of the operation and outputs the operation signal to the processing unit 10.

On the other hand, when an operation according to the example is executed on a surface of the touch panel TP by the user with use of the fingers or the like, the touch panel TP detects a contact position of the fingers or the like on the surface in the operation at preset time intervals, for example, generates position data indicating each detected contact position, and outputs the data to the processing unit 10. The output position data is output via the interface 1 to the control unit 3 and is used for the below-mentioned display control according to the example.

Here, examples of the operation according to the example on the surface of the touch panel TP with use of the fingers or the like are the pinch-out operation and the pinch-in operation using the two fingers simultaneously, "a single tap operation," in which, immediately after the finger or the like is brought into contact with the surface of the touch panel TP once, the finger or the like is released (that is, the touch panel TP is tapped with the finger or the like), and "a double tap operation," in which the single tap operation is performed twice in a row in short time. Based on the output position data, the control unit 3 then detects whether or not the pinch-out operation is performed on the surface of the touch panel TP and, in a case in which the pinch-out operation is performed, detects a position and an operation direction (that is, a direction in which the distance between the fingers is increased in the pinch-out operation) of the pinch-out operation. Also, based on the output position data, the control unit 3 detects whether or not the pinch-in operation is performed on the surface of the touch panel TP and, in a case in which the pinch-in operation is performed, detects a position and an operation direction (that is, a direction in which the distance between the fingers is decreased in the pinch-in operation) of the pinch-in operation. The processing unit 10 including the control unit 3 then executes the below-mentioned display control according to the example based on the detection result.

On the other hand, the sensor 13 detects an orientation of the rectangular display D in a use state by a method such as detection of a direction of gravitational acceleration and outputs orientation data as a detection result to the processing unit 10. At this time, for example, in a case in which the user who uses the portable terminal apparatus SV performs the pinch-out operation or the like, holding the terminal apparatus SV so that the rectangular display D may be vertically long as seen by the user himself/herself, the sensor 13 outputs to the processing unit 10 the orientation data indicating that the user is using the terminal apparatus SV in a state of the vertically long screen. Conversely, in a case in which the user performs the pinch-out operation or the like, holding the terminal apparatus SV so that the display D may be horizontally long as seen by the user himself/herself, the sensor 13 outputs to the processing unit 10 the orientation data indicating that the user is using the terminal apparatus SV in a state of the horizontally long screen. In this manner, the orientation data is output via the interface 1 to the control unit 3 and is used for the below-mentioned display control according to the example.

Meanwhile, in the following description, a state in which the user who uses the terminal apparatus SV is using the terminal apparatus SV, holding the terminal apparatus SV so that the display D may be vertically long as seen by the user himself/herself is referred to simply as "a vertically long screen use state". Conversely, a state in which the user is using the terminal apparatus SV, holding the terminal apparatus SV so that the display D may be horizontally long as seen by the user himself/herself is referred to simply as "a horizontally long screen use state".

Based on the aforementioned operation signal from the operation designation unit 11, the aforementioned orientation data from the sensor 13, and the aforementioned position data from the touch panel TP, the control unit 3 of the processing unit 10 then controls processing or operations of the terminal apparatus SV including the below-mentioned display control according to the example with use of the data or the like acquired via the external interface 14, and the programs and the like and the association table T recorded in the recording unit 12. At this time, based on a use state of the display D indicated by the orientation data and respective contact positions on the touch panel TP or the like indicated by the position data, the control unit 3 refers to the contents of the association table T recorded in the recording unit 12 and executes the below-mentioned display control according to the example with use of the display D. Here, "the use state of the display D" aforementioned means a use state of whether the terminal apparatus SV comprising the display D is being used in the vertically long screen use state or in the horizontally long screen use state (the same is true of the following description).

Next, the display control according to the example, which is part of processing or operations in the processing unit 10, will specifically be described with reference to FIGS. 2 to 5. Meanwhile, the display control described below is display control, in a case in which a map image is displayed on the display D, executed for the map image when the pinch-out operation and the single tap operation or the double tap operation are executed on the touch panel TP. Here, the map image includes images indicating roads and places and images indicating names of the roads and the places. Further, as map data for use in displaying the map image including these images on the display D, road data corresponding to the roads, place data corresponding to the places, and name data comprising letter strings corresponding to the names are recorded in the recording unit 12 in a non-volatile manner.

First, the association table T according to the example recorded in the recording unit 12 in a non-volatile manner will specifically be described with reference to FIG. 3.

The association table T according to the example is an association table indicating association among the use state of the display D indicated by the orientation data, the operation direction and the like of the pinch-out operation indicated by the position data, and the contents of the display control to be executed to correspond to the operation, as specifically illustrated in FIG. 3.

In FIG. 3, a state in which the fact that the use state of the display D is the vertically long screen use state is indicated by the orientation data is defined and described as "Vertical" in the section "Display Orientation." Similarly, in FIG. 3, a state in which the fact that the use state of the display D is the horizontally long screen use state is indicated by the orientation data is defined and described as "Horizontal" in the section "Display Orientation."

Also, in FIG. 3, a state in which, regardless of whether the use state of the display D is the vertically long screen use state or the horizontally long screen use state, the fact that the pinch-out operation is performed so that the operation direction when the user opens his/her fingers on the touch panel TP may be a vertical direction is indicated by the position data is defined and described as "Vertical-Direction Pinch-Out" in the section "Operation." Similarly, a state in which, regardless of whether the use state of the display D is the vertically long screen use state or the horizontally long screen use state, the fact that the pinch-out operation is performed so that the operation direction when the user opens his/her fingers on the touch panel TP may be a horizontal direction is indicated by the position data is defined and described as "Horizontal-Direction Pinch-Out" in the section "Operation." Meanwhile, in a case of considering actual operability, "the vertical direction" in this case not only includes a direction parallel to the longer side in a case in which the use state of the display D is the vertically long screen use state or a direction parallel to the shorter side in a case in which the use state of the display D is the horizontally long screen use state but also includes preset "directions within a range of angles at which the direction can be regarded as the vertical direction" including these directions. Similarly, "the horizontal direction" in this case not only includes a direction parallel to the shorter side in a case in which the use state of the display D is the vertically long screen use state or a direction parallel to the longer side in a case in which the use state of the display D is the horizontally long screen use state but also includes preset "directions within a range of angles at which the direction can be regarded as the horizontal direction" including these directions.

Further, in a case in which the map image is being displayed on the display D for example, in which the use state of the display D is the vertically long screen use state, and in which the pinch-out operation in the vertical direction is performed on the touch panel TP on the surface of the display D, the association table T illustrated in FIG. 3 describes that display control in which images corresponding to the map itself in the map image (that is, images indicating roads and places except images indicating letter strings including the names) are enlarged and displayed is to be executed. Also, for example, in a case in which the use state of the display D is the horizontally long screen use state and in which the pinch-out operation in the horizontal direction is performed on the touch panel TP on the surface of the display D, the association table T illustrated in FIG. 3 describes that display control in which images corresponding to the map itself in the map image are enlarged and displayed is to be executed.

Further, in a case in which the map image is being displayed on the display D, for example, in which the use state of the display D is the vertically long screen use state, and in which the pinch-out operation in the horizontal direction is performed once on the touch panel TP on the surface of the display D, the association table T illustrated in FIG. 3 describes that display control in which an image indicating a letter string including the name at a position on the map corresponding to the position at which the horizontal pinch-out operation has been performed once is enlarged and displayed is to be executed. Also, for example, in a case in which the use state of the display D is the horizontally long screen use state and in which the pinch-out operation in the vertical direction is performed once on the touch panel TP on the surface of the display D, the association table T illustrated in FIG. 3 describes that display control in which an image indicating a letter string including the name at a position on the map corresponding to the position at which the vertical pinch-out operation has been performed once is enlarged and displayed is to be executed.

Still further, in a case in which the map image is being displayed on the display D, in which the use state of the display D is the vertically long screen use state, and in which the pinch-out operation in the horizontal direction is performed twice or more times on the touch panel TP on the surface of the display D, or in a case in which the use state of the display D is the horizontally long screen use state and in which the pinch-out operation in the vertical direction is performed twice or more times on the touch panel TP on the surface of the display D, the association table T illustrated in FIG. 3 describes that the following display control is to be executed.

(a) Case in Which Horizontal Pinch-Out Operation or Vertical Pinch-Out Operation is Performed Twice Display control in which a color of a letter string itself in an image indicating the letter string including the name which is to be enlarged and displayed in the case in which the horizontal pinch-out operation has been performed once is changed to a preset different color (b) Case in Which Horizontal Pinch-Out Operation or Vertical Pinch-Out Operation is Performed Three Times Display control in which a preset different color is added to the background of the letter string in the image indicating the letter string including the name which is to be enlarged and displayed in the above-described case, or in which an original background color is changed to the different color (c) Case in Which Horizontal Pinch-Out Operation or Vertical Pinch-Out Operation is Performed Four Times Display control in which the display state of the image indicating the letter string including the name which has been changed by the previous pinch-out operations is initialized (reset) (Meanwhile, as the display control of the initialization, the image indicating the letter string including the name which has been changed by the previous pinch-out operations may be deleted from the display D, and the sound corresponding to the letter string may automatically be output.)

Further also, in a case in which the double tap operation is performed on the touch panel TP, regardless of whether the use state of the display D is the vertically long screen use state or the horizontally long screen use state, the association table T illustrated in FIG. 3 describes that display control in which images corresponding to the map itself in the map image are enlarged and displayed, with a position on the map corresponding to the position at which the double tap operation has been performed being centered, is to be executed.

Also, in a case in which the single tap operation is performed once on the touch panel TP, and in which a position on the map corresponding to the position at which the single tap operation has been performed is in a preset range, with a position at which a letter string including the name is to be displayed being centered (that is, the position at which the single tap operation has been performed is around a position at which a letter string including the name is to be displayed), the association table T illustrated in FIG. 3 describes that display control in which an image indicating the letter string including the name is enlarged and displayed is to be executed. In addition to this, in a case in which the single tap operation is performed twice or more times at predetermined time intervals (except a case of the double tap operation) on the touch panel TP, and in which the position at which the single tap operation has been performed twice is around a position at which a letter string including the name is to be displayed, the association table T illustrated in FIG. 3 describes that the following display control is to be executed for an image indicating the letter string including the name.

(d) Case in Which the Single Tap Operation is Performed Twice

Display control in which a color of a letter string itself in the image indicating the letter string including the name is changed to a preset different color (e) Case in Which the Single Tap Operation is Performed Three Times Display control in which a preset different color is added to the background of the letter string in the image indicating the letter string including the name, or in which an original background color is changed to the different color (f) Case in Which the Single Tap Operation is Performed Four Times Display control in which the display state of the image indicating the letter string including the name which has been changed by the previous single tap operations is initialized (reset)

Next, the display control according to the example with use of the association table T will specifically be described. Further, it is to be noted that the display control according to the example is processing to be executed as part of processing or operations in the processing unit 10, such as interrupt processing or the like at preset time intervals. Also, as a prerequisite for the display control according to the example, the map image is displayed on the display D.

That is, as illustrated in FIG. 4, when the display control according to the example is started, the control unit 3 of the processing unit 10 determines whether or not the position data has been input via the interface 1 and monitors whether or not any pinch-out operation has been executed on the surface of the touch panel TP (step S1). In the monitoring in step S1, the operation direction of the pinch-out operation is not required to be detected, but whether or not the two fingers of the user are contacting the touch panel TP, and whether or not the respective contact positions are being moved so that the distance between the two fingers may be increased, may be detected, for example.

In a case in which execution of any pinch-out operation is not detected in the monitoring in step S1 (step S1: NO), the control unit 3 moves to below-mentioned determination in step S13. Conversely, in a case in which execution of any pinch-out operation is detected in the monitoring in step S1 (step S1: YES), the control unit 3 determines a use state of the display D at the time based on the orientation data (step S2). In the determination in step S2, when the use state of the display D at the time is the vertically long screen use state (step S2: Vertical), the control unit 3 determines an operation direction of the pinch-out operation detected in the monitoring in step S1 based on the position data (step S3). In the determination in step S3, when the pinch-out operation executed at the time is the vertical pinch-out operation (step S3: Vertical), the control unit 3 then reads out and refers to the association table T (refer to FIG. 3) recorded in the recording unit 12 via the interface 1 and executes the display control in which images corresponding to the map itself in the map image displayed at the time are enlarged and displayed (step S4). In this case, in a case in which, at the time of the determination in step S3, the image of a map MP illustrated in the upper part of FIG. 5 is displayed on the display D, which is in the vertically long screen use state, and in which the map MP includes road marks R indicating the road, a present position mark PM, and a name mark PO, for example, road marks RR into which only roads corresponding to the original road marks R are enlarged and displayed are displayed as illustrated on the lower left part of FIG. 5 by means of the display control in step S4. At this time, the control unit 3 may display a scale at a certain position in each of the maps MP before and after enlargement as illustrated in FIG. 5. This can cause the user to clearly recognize that the image is being enlarged and displayed. After the display control in step S4 has been executed, the control unit 3 returns to step S1 and monitors whether or not a new pinch-out operation has been executed.

Conversely, in the determination in step S3, when the pinch-out operation executed at the time is the horizontal pinch-out operation (step S3: Horizontal), the control unit 3 then determines the cumulative number of times of the horizontal pinch-out operation (that is, the cumulative number of times of the horizontal pinch-out operation when the first horizontal pinch-out operation (step S3: Horizontal) and the subsequent horizontal pinch-out operations are detected) (step S6).

In the determination in step S6 at the time, since the number of times of the horizontal pinch-out operation is one (step S6: Once), the control unit 3 reads out and refers to the association table T via the interface 1 and executes the display control in which, in the map image displayed at the time, only the name mark PO at a position on the map MP corresponding to the position at which the horizontal pinch-out operation has been performed is enlarged and displayed as an enlarged name mark POO as illustrated on the lower right part of FIG. 5 (step S7). After the display control in step S7 has been executed, the control unit 3 then counts the number of times of the horizontal pinch-out operation at the time (that is, "Once" at the time) (step S8), returns to step S1, and monitors whether or not a new pinch-out operation has been executed.

Thereafter, in a case in which the horizontal pinch-out operation is additionally executed around the same position on the touch panel TP (repeat of the step S1: YES→the step S2: Vertical→the step S3: Horizontal→the step S6), the control unit 3 reads out and refers to the association table T via the interface 1 each time of the horizontal pinch-out operation (refer to step S8). In a case in which the cumulative number of times of the horizontal pinch-out operation is two (step S6: Twice), the control unit 3 executes the display control in which the color of the enlarged letter string itself in the name mark POO (refer to the lower left part of FIG. 5) is changed to a preset different color (step S9) and increments the cumulative number of times (step S8). In a case in which the cumulative number of times of the horizontal pinch-out operation is three (step S6: Three Times), the control unit 3 executes the display control in which a preset different color is added to the background of the enlarged letter string in the name mark POO or in which an original background color is changed to the different color (step S10) and increments the cumulative number of times (step S8). In a case in which the cumulative number of times of the horizontal pinch-out operation is four (step S6: Four Times), the control unit 3 executes the display control in which the display state of the enlarged name mark POO is initialized (reset) (step S11) and initializes (resets) the cumulative number of times (step S12). After each of the steps, the control unit 3 returns to step S1 and monitors whether or not a new pinch-out operation has been executed.

Conversely, in the determination in step S2, when the use state of the display D at the time is the horizontally long screen use state (step S2: Horizontal), the control unit 3 then determines an operation direction of the pinch-out operation detected in the monitoring in the step S1 based on the position data (step S5), in a similar manner to that in the step S3. In the determination in step S5, when the pinch-out operation executed at the time is the horizontal pinch-out operation (step S5: Horizontal), the control unit 3 moves to step S4 and executes the display control in which images corresponding to the map itself in the map image displayed at the time are enlarged and displayed (step S4, refer to the lower left part of FIG. 5). After the display control in step S4 has been executed, the control unit 3 returns to step S1 and monitors whether or not a new pinch-out operation has been executed.

Conversely, in the determination in step S5, when the pinch-out operation executed at the time is the vertical pinch-out operation (step S5: Vertical), the control unit 3 then determines the cumulative number of times of the vertical pinch-out operation (that is, the cumulative number of times of the vertical pinch-out operation when the first vertical pinch-out operation (step S5: Vertical) and the subsequent vertical pinch-out operations are detected) (step S6).

In the determination in step S6 at the time, since the number of times of the vertical pinch-out operation is one (step S6: Once), the control unit 3 then reads out and refers to the association table T via the interface 1 and, in the map image displayed at the time, enlarges and displays only the name mark PO at a position on the map MP corresponding to the position at which the vertical pinch-out operation has been performed as the enlarged name mark POO as illustrated on the lower right part of FIG. 5 (step S7). Thereafter, the control unit 3 thereafter counts the number of times of the vertical pinch-out operation at the time (that is, "Once" at the time) (step S8), returns to step S1, and monitors whether or not a new pinch-out operation has been executed.

Thereafter, in a case in which the vertical pinch-out operation is additionally executed around the same position on the touch panel TP (repeat of the step S1: YES→the step S2: Horizontal→the step S5: Vertical→the step S6), the control unit 3 reads out and refers to the association table T via the interface 1 each time of the vertical pinch-out operation (refer to step S8). In a case in which the cumulative number of times of the vertical pinch-out operation is two (step S6: Twice), the control unit 3 executes the display control in which the color of the enlarged letter string itself in the name mark POO is changed to a preset different color (step S9) and increments the cumulative number of times (step S8). In a case in which the cumulative number of times of the vertical pinch-out operation is three (step S6: Three Times), the control unit 3 executes the display control in which a preset different color is added to the background of the enlarged letter string in the name mark POO or in which an original background color is changed to the different color (step S10) and increments the cumulative number of times (step S8). In a case in which the cumulative number of times of the vertical pinch-out operation is four (step S6: Four Times), the control unit 3 executes the display control in which the display state of the enlarged name mark POO is initialized (reset) (step S11) and initializes (resets) the cumulative number of times (step S12). After each of the steps, the control unit 3 returns to step S1 and monitors whether or not a new pinch-out operation has been executed.

In a case in which execution of any pinch-out operation is not detected in the monitoring in step S1 (step S1: NO), the control unit 3 then determines whether or not the position data has been input via the interface 1 to determine whether or not the tap operation has been executed on the surface of the touch panel TP (step S13). In a case in which no tap operation is executed in the determination in step S13 (step S13: NO), the control unit 3 returns to original processing or operations in the processing unit 10.

Conversely, in a case in which the tap operation has been executed in the determination in step S13 (step S13: YES), the control unit 13 then determines whether the executed tap operation is the single tap operation or the double tap operation (step S14). In a case in which execution of the double tap operation has been detected in the determination in step S14 (step S14: Double Tap), the control unit 3 reads out and refers to the association table T via the interface 1, moves to step S4 described above, and executes the subsequent display control.

Conversely, in a case in which execution of the single tap operation has been detected in the determination in step S14 (step S14: Single Tap), the control unit 3 then determines whether or not the position at which the single tap operation has been executed is around a letter string including any name in the map MP displayed on the display D at the time (step S15). In the determination in step S15, the control unit 3 performs the determination in step S15 by determining whether or not the position on the map corresponding to the position at which the single tap operation has been performed is in a present range, with a position at which a letter string including the name is to be displayed being centered. In a case in which, in the determination in step S15, the position at which the single tap operation has been performed is not around a letter string including any name (step S15: NO), the control unit 3 returns to step S1 and monitors whether or not a new pinch-out operation has been executed.

In a case in which, in the determination in step S15, the position at which the single tap operation has been performed is around a letter string including any name (step S15: YES), the control unit 3 then determines the cumulative number of times of the single tap operation (that is, the cumulative number of times of the single tap operation when the first single tap operation (step S14: Single Tap) and the subsequent single tap operations are detected) (step S16).

In the determination in step S16 at the time, since the number of times of the single tap operation is one (step S16: Once), the control unit 3 then reads out and refers to the association table T via the interface 1 and, in the map image displayed at the time, enlarges and displays the name mark PO at a position on the map MP corresponding to the position at which the single tap operation has been performed as the name mark POO, for example (step S7). After the display control in step S7 has been executed, the control unit 3 then counts the number of times of the single tap operation at the time (that is, "Once" at the time) (step S8), returns to step S1, and monitors whether or not a new pinch-out operation has been executed.

Thereafter, in a case in which the single tap operation (except the double tap operation) is additionally executed around the same position on the touch panel TP (repeat of the step S1: NO→the step S13: YES→the step S14: Single Tap→the step S15: YES→the step S16), the control unit 3 reads out and refers to the association table T via the interface 1 each time of the single tap operation (refer to step S8). In a case in which the cumulative number of times of the single tap operation is two (step S16: Twice), the control unit 3 executes the display control in which the color of the enlarged letter string itself in the name mark POO is changed to a preset different color (step S9) and increments the cumulative number of times of the single tap operation (step S8). In a case in which the cumulative number of times of the single tap operation is three (step S16: Three Times), the control unit 3 executes the display control in which a preset different color is added to the background of the enlarged letter string in the name mark POO or in which an original background color is changed to the different color (step S10) and increments the cumulative number of times of the single tap operation (step S8). In a case in which the cumulative number of times of the single tap operation is four (step S16: Four Times), the control unit 3 executes the display control in which the display state of the enlarged name mark POO is initialized (reset) (step S11) and initializes (resets) the cumulative number of times of the single tap operation (step S12). After each of the steps, the control unit 3 returns to step S1 and monitors whether or not a new pinch-out operation has been executed.

As each described above, with the operation control according to the example, with use of the association table T, which associates with each other an orientation of display on the display D (that is, whether the display D is in the vertically long screen use state or in the horizontally long screen use state), a moving direction of a contact position on the touch panel TP (for example, an operation direction in the pinch-out operation), and a display state controlled by movement of the contact position, the display state on the display D is controlled in accordance with the orientation of the display and the moving direction based on the association table T. Accordingly, in accordance with an orientation of display on the display D, a different display state can be controlled by single movement of a contact position.

Also, in a case in which the map MP including letter strings, marks, and the like is being displayed on the display D, which is in the vertically long screen use state, and in which the vertical pinch-out operation is performed, roads and the like on the map MP except letter strings, marks, and the like are enlarged and displayed. In a state in which the horizontal pinch-out operation is performed, any one of letter strings, marks, and the like is enlarged and displayed. Accordingly, in the vertically long screen use state, either any one of letter strings, marks, and the like or the other map components (roads and the like) can be enlarged and displayed by a single pinch-out operation.

Further, in a case in which the map MP is being displayed on the display D, which is in the horizontally long screen use state, and in which the horizontal pinch-out operation is performed, roads and the like on the map MP are enlarged and displayed. In a state in which the vertical pinch-out operation is performed, any one of letter strings, marks, and the like are enlarged and displayed. Accordingly, in the horizontally long screen use state, either any one of letter strings, marks, and the like or the other map components (roads and the like) also can be enlarged and displayed by a single pinch-out operation.

Still further, in a case in which the pinch-out operation for enlargement of any one of letter strings, marks, and the like is performed twice, a color of the one of letter strings, marks, and the like itself is changed. In a case in which the pinch-out operation is performed three times, a color is added or changed so that the background of the one of letter strings, marks, and the like may have a preset background color. In a case in which the pinch-out operation is performed four times, the change of the display state of the one of letter strings, marks, and the like is initialized. Accordingly, a display state of the one of letter strings, marks, and the like can be controlled in more various ways. That is, since information indicating changes of a display state of any one of letter strings, marks, and the like in accordance with the number of times of the pinch-out operations for enlarging the one of the letter strings, marks, and the like is included in the association table T, a display state of the one of letter strings, marks, and the like can be controlled in more various ways.

Also, at the time of enlarging any one of letter strings, marks, and the like, in a case in which position data indicating the position of the one of letter strings, marks, and the like to be enlarged is acquired, and the one of letter strings, marks, and the like at the position indicated by the position data is enlarged and displayed only, any one of letter strings, marks, and the like that the user desires can be enlarged and displayed.

Further, when the single tap operation is performed, any one of letter strings, marks, and the like on the map corresponding to the position of the single tap operation is enlarged and displayed. When the double tap operation is performed, map components except letter strings, marks, and the like are enlarged and displayed. Accordingly, with use of either the single tap operation or the double tap operation, either any one of letter strings, marks, and the like or map components can be enlarged and displayed.

MODIFICATION EXAMPLES

Next, modification examples of the embodiment will be described.

In the aforementioned example, display control of an image on the map MP on the display D in accordance with a use state of the display D and an operation direction of the pinch-out operation has been executed. In addition, display control of an image on the map MP on the display D, such as a size decrease of an image on the map MP, in accordance with an operation direction of a pinch-in operation (that is, an operation direction in an operation of decreasing the distance between fingers) and a use state of the display D (that is, either the vertically long screen use state or the horizontally long screen use state) can be executed.

In this case, the following display control can be thought of. When a vertical pinch-in operation is performed in the vertically long screen use state, or when a horizontal pinch-in operation is performed in the horizontally long screen use state, display control in which an image of the map MP is shrunk is executed. On the other hand, when the horizontal pinch-in operation is performed in the vertically long screen use state, or when the vertical pinch-in operation is performed in the horizontally long screen use state, display control in which a display state of any one of letter strings, marks, and the like for the name or the like is changed is executed.

Also, when the display control according to the aforementioned example in which an image on the map MP is enlarged and displayed is executed (refer to the lower left part of FIG. 5), the control unit 3 may enlarge and display the present position mark PM itself to match enlargement of the image of the map MP. This configuration enables the user to recognize more clearly that the image on the map MP is being enlarged and displayed.

Further, in the aforementioned example, the display control in the terminal apparatus SV including the rectangular display D has been described. Alternatively, a terminal apparatus including a square display can execute similar display control to the display control according to the example by defining a use state of the display as in the example.

Still further, by recording the aforementioned program corresponding to the flowchart illustrated in FIG. 4 in a recording medium such as an optical disc and a hard disc or acquiring the program via a network such as the Internet, reading out the program to a general-purpose microcomputer or the like, and executing the program, the microcomputer or the like can function as the processing unit 10 according to the example.

REFERENCE SIGNS LIST 1 associated information acquisition means (interface)
2 direction information acquisition means
3 control means (control unit)
10 processing unit
13 sensor
TP operation unit (touch panel)
D display means (display)
T association table
MP map
R, RR road mark
PO, POO name mark
PM present position mark

The invention claimed is:

1. A single display control apparatus, comprising:
an interface on the single display control apparatus, comprising a touch panel, configured to accept an operation inputted by the touch panel on a plurality of operation targets included in an image displayed on the interface, the plurality of operation targets including a map image as one of the operation targets, and a letter string image as another one of the operation targets, the letter string image relating to the map image on the single display control apparatus; and
a processor located within the single display control apparatus configured to cause the displayed image to reflect the accepted operation on the plurality of operation targets,
wherein, in a case in which the interface accepts the operation inputted by the touch panel corresponding to a longer side direction of the display, the processor is configured to cause the map image reflecting the accepted operation corresponding to the longer side direction to be displayed,
wherein, in a case in which the interface accepts the operation inputted by the touch panel corresponding to a shorter side direction of the display, the processor is configured to cause the letter string image reflecting the accepted operation corresponding to the shorter side direction to be displayed,
wherein the displayed one of the plurality of operation targets in the case in which the interface accepts the operation corresponding to the longer side direction does not include the letter string image,
wherein the displayed one of the plurality of operation targets in the case in which the interface accepts the operation corresponding to the shorter side direction does not include the map image, and
wherein the processor is further configured to
enlarge the map image reflecting the accepted operation corresponding to the longer side direction in the case in which the interface accepts the operation inputted by the touch panel corresponding to the longer side direction of the display, wherein rest of the image is not enlarged and is displayed on the interface, and
enlarge the letter string image reflecting the accepted operation corresponding to the shorter side direction in the case in which the interface accepts the operation inputted by the touch panel corresponding to the shorter side direction of the display, wherein rest of the image is not enlarged and is displayed on the interface.

2. The display control apparatus according to claim 1, wherein
the image displayed comprises an image of a map including the letter string or a mark,
in a case in which the display of the map is displayed vertically in a lengthwise manner,
the processor configured to set, in the case in which the interface accepts the operation corresponding to the longer side direction, any of the elements of the map excluding the letter string or the mark as the one of the operation targets,
the processor configured to set, in the case in which the interface accepts the operation corresponding to the shorter side direction, the letter string or the mark as the another one of the operation targets, and
the processor configured to cause the displayed image to reflect the accepted operation.

3. The display control apparatus according to claim 2, wherein the processor is configured to change the display state of the letter string or the mark in accordance with the number of times of the operation in the case in which the another one of the operation targets is the letter string or the mark.

4. The display control apparatus according to claim 2, further comprising:
the interface, for the letter string or the mark being the another one of the operation targets, configured to acquire position information indicative of a position of the letter string or the mark of the operation target,
wherein the processor is configured to set the letter string or the mark at the position indicated by the position information acquired as the another one of the operation targets.

5. The display control apparatus according to claim 1, wherein
the image displayed comprises an image of a map including the letter string or a mark,
in a case in which the display of the map is displayed horizontally in a lengthwise manner,
the processor configured to set, in the case in which the interface accepts the operation corresponding to the longer side direction, any of the elements of the map excluding the letter string or the mark as the one of the operation targets,
the processor configured to set, in the case in which the interface accepts the operation corresponding to the shorter side direction, the letter string or the mark as the another one of the operation targets, and
the processor configured to cause the displayed image to reflect the accepted operation.

6. The display control apparatus according to claim 1, wherein, at least in a case in which the longer side direction is perpendicular to the shorter side direction, the map image corresponding to the longer side direction and the operation target corresponding to the shorter side direction are different.

7. The display control apparatus according to claim 1, wherein the single display control apparatus is located in a vehicle.

8. The display control apparatus according to claim 1, wherein the touch panel is included in a navigation apparatus, a tablet terminal apparatus, or a smartphone.

9. A display control method executed in a single display control apparatus comprising an interface, comprising a touch panel, that accepts an operation inputted by the touch panel on a plurality of operation targets included in an image displayed on the interface, the plurality of operation targets including a map image as one of the operation targets, and a letter string image as another one of the operation targets, the letter string image relating to the map image on the single display control apparatus, the method comprising:

causing the displayed image to reflect the accepted operation on the plurality of operation targets on the single display control apparatus, wherein, in a case in which the interface accepts the operation corresponding to a longer side direction of the display, a processor located within the single display control apparatus is configured to cause the map image reflecting the accepted operation inputted by the touch panel corresponding to the longer side direction to be displayed, and wherein, in a case in which the interface accepts the operation corresponding to shorter side direction of the display means, the processor is configured to cause the letter string image reflecting the accepted operation inputted by the touch panel corresponding to the shorter side direction to be displayed, wherein the displayed one of the plurality of operation targets in the case in which the interface accepts the operation corresponding to the longer side direction does not include the letter string image, and wherein the displayed one of the plurality of operation targets in the case in which the interface accepts the operation corresponding to the shorter side direction does not include the map image, enlarging the map image reflecting the accepted operation corresponding to the longer side direction in the case in which the interface accepts the operation inputted by the touch panel corresponding to the longer side direction of the display, wherein rest of the image is not enlarged and is displayed on the interface, and enlarging the letter string image reflecting the accepted operation corresponding to the shorter side direction in the case in which the interface accepts the operation inputted by the touch panel corresponding to the shorter side direction of the display, wherein rest of the image is not enlarged and is displayed on the interface.

10. A non-transitory computer readable medium containing instructions storable in a storage and executed by the computer included in a single display control apparatus comprising an interface, comprising a touch panel, configured to accept an operation inputted by the touch panel on a plurality of operation targets included in an image displayed via the interface, the plurality of operation targets including a map image as one of the operation targets, and a letter string image as another one of the operation targets, the letter string image relating to the map image on the single display control apparatus, the instructions comprising:

causing the displayed image to reflect the accepted operation on the plurality of operation targets on the single display control apparatus, wherein, in a case in which the interface accepts the operation corresponding to a longer side direction of the display, a processor located within the single display control apparatus causes the map image reflecting the accepted operation inputted by the touch panel corresponding to the longer side direction to be displayed, and wherein, in a case in which the interface accepts the operation inputted by the touch panel corresponding to shorter side direction of the display, the processor causes the letter string image reflecting the accepted operation corresponding to the shorter side direction to be displayed, wherein the displayed one of the plurality of operation targets in the case in which the interface accepts the operation corresponding to the longer side direction does not include the letter string image, and wherein the displayed one of the plurality of operation targets in the case in which the interface accepts the operation corresponding to the shorter side direction does not include the map image, enlarging the map image reflecting the accepted operation corresponding to the longer side direction in the case in which the interface accepts the operation inputted by the touch panel corresponding to the longer side direction of the display, wherein rest of the image is not enlarged and is displayed on the interface, and enlarging the letter string image reflecting the accepted operation corresponding to the shorter side direction in the case in which the interface accepts the operation inputted by the touch panel corresponding to the shorter side direction of the display, wherein rest of the image is not enlarged and is displayed on the interface.

* * * * *